United States Patent [19] [11] 3,796,912

Funston [45] Mar. 12, 1974

[54] VERTICAL DEFLECTION LINEARITY AND TEMPERATURE COMPENSATION CIRCUITRY

[75] Inventor: David Lee Funston, Batavia, N.Y.

[73] Assignee: GTE Sylvania Incorporated, Seneca Falls, N.Y.

[22] Filed: Nov. 16, 1972

[21] Appl. No.: 307,151

Related U.S. Application Data

[63] Continuation-in-part of Ser. No. 54,429, July 13, 1970, abandoned.

[52] U.S. Cl. .............................................. 315/27 R
[51] Int. Cl. .............................................. H01j 29/70
[58] Field of Search .......... 315/27 TD, 27 R, 26, 25

[56] References Cited

UNITED STATES PATENTS

| | | | |
|---|---|---|---|
| 3,492,527 | 1/1970 | Griffey | 315/27 R |
| 3,432,720 | 3/1969 | Brunner | 315/27 R |
| 3,174,073 | 3/1965 | Massman et al. | 315/27 R |
| 2,932,766 | 4/1960 | Kraft | 315/27 R |

*Primary Examiner*—Maynard R. Wilbur
*Assistant Examiner*—J. M. Potenza
*Attorney, Agent, or Firm*—Norman J. O'Malley; Thomas H. Buffton; Cyril A. Krenzer

[57] ABSTRACT

In a television receiver having a deflection yoke with vertical deflection windings whose resistance varies as a function of temperature and whose output signal linearity varies as a function of input signal linearity, vertical deflection circuitry includes an oscillator means coupled by a non-linear device to an output circuit means connected to a deflection yoke. Also, a feedback means couples the output circuit means to the oscillator means and includes a thermistor affixed to a heat source whose temperature varies in accordance with temperature variations of the deflection yoke.

11 Claims, 2 Drawing Figures

VERTICAL DEFLECTION LINEARITY AND TEMPERATURE COMPENSATION CIRCUITRY

CROSS-REFERENCE TO RELATED APPLICATION

This application is a Continuation-in-Part of a previously filed application having Ser. No. 54,429, filed July 13, 1970, now abandoned entitled "Vertical Linearity and Temperature Compensation Circuitry" and in the name of David Lee Funston, and assigned to the same assignee as the present invention.

BACKGROUND OF THE INVENTION

In television receivers utilizing a deflection yoke having vertical deflection windings coupled by a transformer to a signal source, it is known that the deflection windings will not provide a sawtooth-shaped output signal in response to a sawtooth-shaped input signal because of the saturation characteristics of the transformer core when direct current flows in the primary winding of the transformer. Thus, it has been found that the current of the primary winding of the transformer must be non-linear if a linear output is to be obtained.

One of the known techniques ordinarily employed in an effort to obtain a desired current having a non-linear waveform is to utilize an oscillator and an output amplifier with a positive-feedback network coupling the output amplifier back to the oscillator. In this method, the positive feedback is employed to overdrive the oscillator and provide an output signal having a non-linear waveform. In turn, the signal with a non-linear waveform and the core saturation characteristics of a transformer combine to effect a linear output from the vertical deflection circuitry.

Although the above technique is widely employed, it has been found that the system does leave something to be desired. For instance, variations in components such as electron tubes, transistors, deflection yokes, and other associated components cause variations in the amount of positive feedback introduced into the circuitry. As a result there is a tendency toward instability of the oscillator which will appear on a viewing screen as undesired "jitter" due to a slight up and down shift in alternate vertical scans of a cathode ray tube viewing screen.

Also, it is known that television receivers have relatively high operating temperatures and that the resistance of the vertical deflection windings of a deflection yoke varies in accordance with variations in the operating temperature of the yoke. Thus, the vertical deflection of an electron beam raster observable to a viewer of a cathode ray tube viewing screen is undesirably altered and especially so during the initial ten to thirty minute period when the receiver is "warming up."

One known method for alleviating the above-mentioned condition is proposed in U.S. Pat. No. 2,900,564 issued Aug. 18, 1959 to W. H. Barkow. Therein, a thermistor is connected in series with the vertical deflection windings of a "saddle" type deflection yoke. Also, the thermistor is disposed in heat transfer relationship with the vertical windings whereby temperature variations of the windings are "tracked" by the affixed thermistor.

Although the above-mentioned system is suitable for use with some apparatus, it has been found that such systems are not applicable to all forms of receivers and deflection systems. For instance, mounting a thermistor contiguous to the vertical deflection windings in a "saddle" type deflection yoke to effect temperature tracking therebetween presents no particular problem due to the structural configuration.

However, in a toroid yoke type of deflection system the configuration of the vertical windings of a toroid wound deflection yoke tend to render it impractical, if not impossible, to provide a continguous temperature related relationship between the windings and a thermistor. Also, series connecting a thermistor to the vertical deflection windings of a toroid yoke adds a relatively large resistance in series with the relatively low resistance of the deflection windings reducing the deflection efficiency of the toroid yoke system as compared with a saddle type yoke system. Thus, the introduction of a thermistor having a relatively large resistance value in series with the vertical deflection windings of a toroid yoke tends to undesirably reduce the inductance to resistance ratio which reduces the sensitivity of the vertical deflection system.

OBJECTS AND SUMMARY OF THE INVENTION

It is an object of the present invention to provide enhanced vertical deflection circuitry for a television receiver. Another object of the invention is to provide vertical deflection circuitry having improved linearity. Still another object of the invention is to provide vertical deflection circuitry having improved sensitivity. A further object of the invention is to provide enhanced compensation for impedance variations in vertical deflection windings due to temperature alteration. A still further object of the invention is to provide a vertical deflection system having enhanced linearity and temperature compensation circuitry.

These and other objects, advantages and capabilities are achieved in one aspect of the invention by vertical deflection circuitry wherein an oscillator means is coupled by a non-linear device to an output circuit means having a transformer coupled to vertical deflection windings of a deflection yoke for a cathode ray tube. A feedback circuit means couples a positive-going potential from the output circuit means back to the oscillator means. Also, the feedback circuit means includes a thermistor contiguous to a heat source and in combination therewith providing a means of compensation for the variation in resistance of the deflection windings of the yoke due to operating temperature variations.

DESCRIPTION OF A PREFERRED EMBODIMENT

For a better understanding of the present invention, together with other and further objects, advantages and capabilities thereof, reference is made to the following disclosure and appended claims in conjunction with the accompanying drawings.

Figure 1:
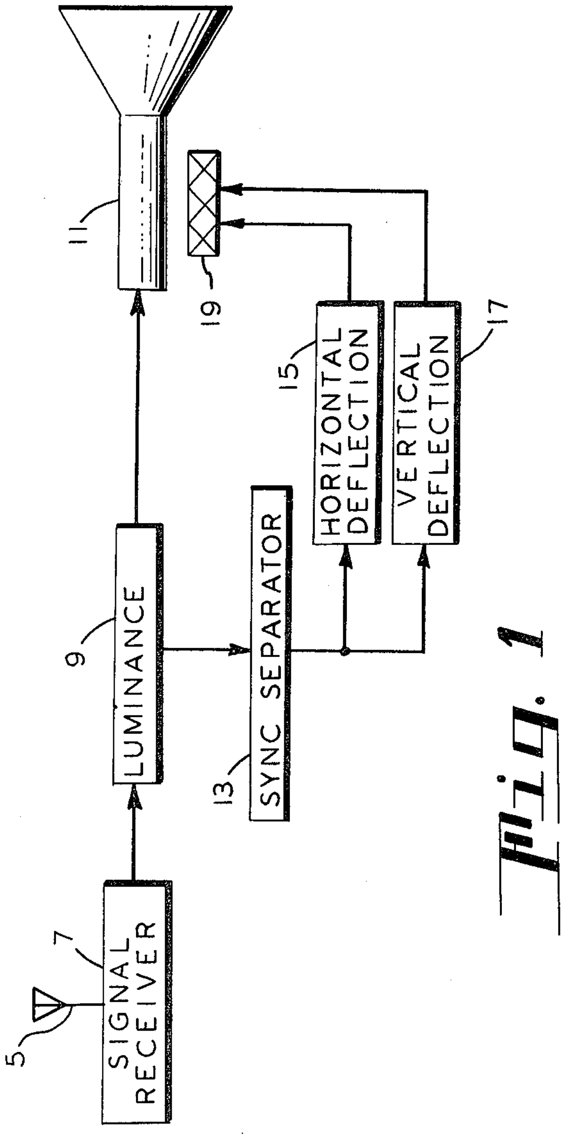
FIG. 1 is a block diagram of a television receiver suitable for employment of the vertical deflection circuitry of the invention.

In the drawings, FIG. 1 illustrates a typical television receiver including an antenna 5 for intercepting transmitted television signals and applying them to a signal receiver stage 7. A luminance channel 9 couples signal receiver stage 7 to a cathode ray tube 11 wherein images representative of the received signals are displayed.

The luminance channel 9 is also coupled to a synchronizing pulse separator stage 13 wherein synchronizing pulse signals at horizontal and vertical frequencies are separated and applied to the horizontal deflection circuitry 15 and to the vertical deflection circuitry 17. In turn, the horizontal and vertical deflection circuitry 15 and 17 is coupled to deflection apparatus 19 associated with the cathode ray tube 11 to effect both horizontal and vertical electron beam scanning.

Figure 2:
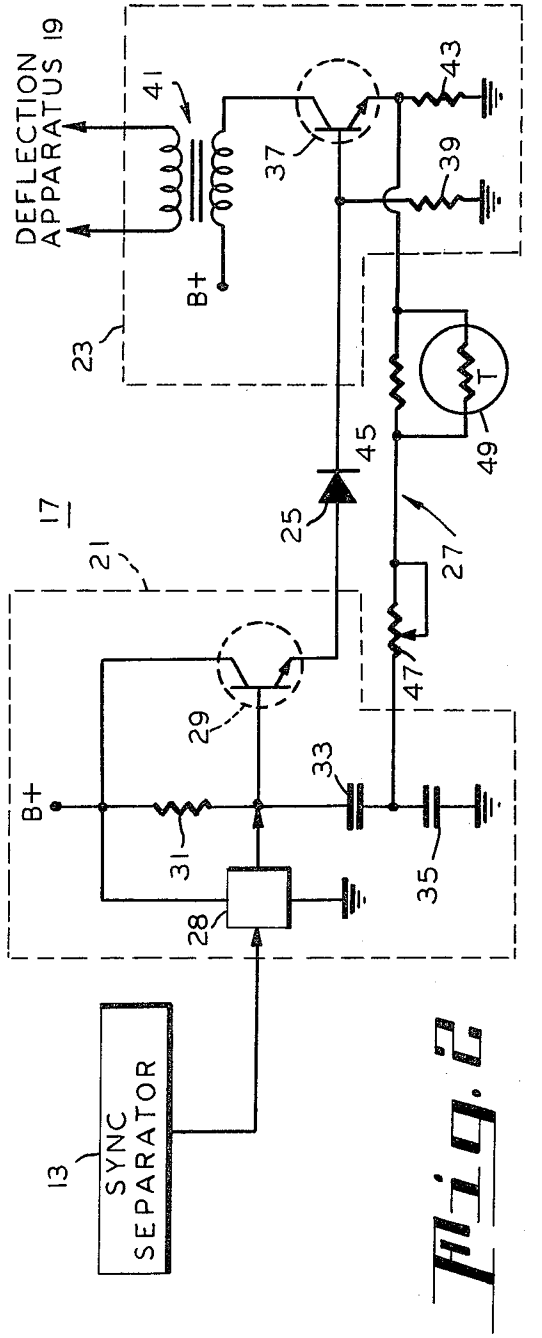
FIG. 2 is a preferred embodiment of vertical deflection circuitry employing linearity and temperature compensation capabilities.

Referring to FIG. 2, a preferred form of vertical deflection circuitry 17 includes an oscillator stage 21 coupled to the synchronizing pulse separator stage 13, an output stage 23 coupled to vertical deflection windings of the deflection apparatus 19, normally in the form of a deflection yoke, a non-linear device 25 coupling the oscillator-driver stage 21 to the output stage 23, and a feedback circuit means 27 coupling the output stage 23 back to the oscillator stage 21.

The oscillator-driver stage 21 includes a discharge device 28, such as a unijunction transistor, a triggered diode, or a multivibrator, coupled to the sync separator stage 13 and intermediate a potential source B+ and a potential reference level such as circuit ground. A driver transistor 29 has a base electrode coupled to the discharge device 28, to the potential source B+ via a resistor 31, and to a potential reference level by way of series connected capacitors 33 and 35. The collector of the driver transistor 29 is coupled to the potential source B+ while the emitter is coupled to the non-linear device 25 which is preferably in the form of a diode.

The output stage 23 includes a transistor 37 mechanically coupled to a heat sink 38 and having a base electrode coupled to the non-linear device 25 and via a resistor 39 to a potential reference level such as circuit ground. The collector electrode of the transistor 37 is coupled to a potential source B+ via the primary of a transformer 41 having its secondary connected to the vertical deflection windings of the deflection apparatus 19 associated with the cathode ray tube 11. The emitter of the transistor 37 is coupled to the potential reference level by a resistor 43 and to a feedback circuit means 27.

The feedback circuit means 27 includes a series connected fixed resistor 45 and alterable resistor 47 connected intermediate the emitter electrode of the transistor 37 of the output stage 23 and the junction of the capacitors 33 and 35. A thermistor 49 is shunt connected across the fixed resistor 45 and contiguous with a heat 38 source having a temperature relationship with the deflection apparatus 19.

More specifically, the thermistor 49 is preferably physically associated with a heat source 38 such as the heat sink normally employed with the transistor 37 of the output stage 23. The thermistor 49 and associated heat source 38 are selected such that the combined shift in impedance of the thermistor 49, due to variations in temperature of the heat source 38, is at a rate and for a period substantially equal to the rate and period during which a substantially similar impedance change in the vertical deflection windings of the deflection apparatus 19 is effected. Thus, impedance alterations in the deflection apparatus 19 due to operational temperature change are "tracked" by a combined thermistor 49 and heat source 38 external to the deflection apparatus 19.

As to operation of the above-described vertical deflection circuitry 17, the oscillator-driver stage 21, controlled by signals from the synchronizing pulse separator stage 13, provides an output signal. This output signal from the oscillator-driver stage 21 is applied to the non-linear device 25 to provide a non-linear signal suitable for application to the output transformer 41 of the output stage 23.

Also, the positive-going non-linear signal available at the output stage 23 is fed back by the feedback circuit means 27 to the oscillator-driver stage 21 to effect an increased amount of drive signal for the driver transistor 29. This added drive signal causes an increase in the non-linearity of the signals available from the oscillator-driver stage 21. Thus, the non-linear device 25 and feedback circuit means 27 combine to provide a signal having a desired non-linearity for effecting derivation of a linear signal to cause linear vertical scanning of the cathode ray tube 11.

Further, the positive-going signal fed back from the output stage 23 to the oscillator-driver stage 21 is of an amount which varies in accordance with variations in resistance of the vertical windings of the deflection apparatus 19. Moreover, the fed back signal is adjustable by means of the alterable resistor 47 of the feedback means 27.

As an example of component values suitable to a particular embodiment but in no way limiting the invention to a particular embodiment or specific value, the following typical component values may be employed:

| | |
|---|---|
| Transistors: | |
| **29** | NPN — 2N3694 |
| **37** | NPN — 2N3694 |
| Capacitors: | |
| **C33** | 1 μf/100$^{v}$ |
| **C35** | 0.47 μf/100$^{v}$ |
| Resistors: | |
| **R31** | 100–150 K ohms |
| **R39** | 1 K ohms |
| **R43** | 10 ohms |
| **R45** | 3.3 K ohms |
| **R47** | 25 K ohms |
| **Thermistor-49** | Keystone-1500 Ω cold **1900B** |
| **Diode-25** | Silicon Gen. Instruments IN 4148 |

To reiterate, vertical deflection systems using a transformer to drive a deflection yoke to produce a sawtooth-shaped output current require a non-linear shaped input current due to the saturation characteristics of the transformer. Also, deflection yokes of the toroid type have much less copper and resistance than a "saddle" type deflection yoke. Therefore, series connecting a temperature compensating means to the windings of a toroid yoke would deleteriously effect the efficiency and sensitivity of the system. Moreover, attaching a temperature compensating means to a toroid yoke is difficult, if not impossible, due to the configuration thereof.

Thus, there has been provided unique vertical deflection circuitry suitable for use with a cathode ray tube display device for a television receiver. The circuitry not only provides enhanced linearity of a vertical deflection signal by utilization of a combined non-linear device and positive feed-back circuit means but also provides compensation for resistance variations in the deflection windings due to temperature variation by apparatus external to the actual deflection apparatus.

While there has been shown and described what is at present considered the preferred embodiment of the invention, it will be obvious to those skilled in the art that various changes and modifications may be made therein without departing from the invention as defined by the appended claims.

What is claimed is:

1. In the television receiver having a source of synchronizing pulse signals and a toroid-wound deflection yoke with vertical deflection windings of a conductor having a temperature coefficient of resistance wherein the resistance varies as a function of temperature, vertical deflection circuitry comprising in combination;

Oscillator-driver means coupled to said source of synchronizing pulse signals;

Output circuit means including an output transformer and amplifier stage with said transformer coupled to said vertical deflection windings of said deflection yoke and said amplifier stage coupled to said transformer and mechanically associated with a heat sink;

A non-linear device coupling said oscillator-driver means to said output circuit means; and Feedback circuit means coupling said amplifier stage of said output circuit means to said oscillator-driver means, said feedback circuit means including a thermistor mechanically associated with said heat sink whereby said non-linear device and said feedback means combine to effect development of a signal suitable for deriving a substantially linear output signal from said vertical deflection windings.

2. The combination of claim 1 wherein said non-linear device is in the form of a unidirection conductor semiconductor device.

3. The combination of claim 1 wherein said non-linear device is in the form of a diode.

4. The combination of claim 1 wherein said feedback means is in the form of a temperature compensated positive feedback loop.

5. The combination of claim 1 wherein said feedback means includes a thermistor affixed to a heat source having a time period of temperature change substantially equal to the time period of temperature change of said deflection yoke.

6. The combination of claim 1 wherein said feedback means includes a thermistor affixed to a heat source and said thermistor and heat source combine to provide a shift in impedance of said thermistor in an amount substantially proportional to the impedance shift of said deflection yoke, said impedance shift of said thermistor and deflection yoke having substantially the same rate and time period of impedance change.

7. The combination of claim 1 wherein said amplifier stage of said output circuit means is in the form of a transistor having a heat sink and said feedback means includes a thermistor affixed to said heat sink.

8. In a television receiver having a source of synchronizing signals and a toroid-wound deflection yoke with a vertical deflection winding having a conductor with a resistance value which varies as a function of temperature, vertical deflection temperature compensating circuitry comprising in combination;

Oscillator-driver means coupled to said source of synchronizing signals;

Output circuit means including an output transformer coupled to said vertical deflection windings of said deflection yoke and an amplifier stage coupled to said output transformer and associated with a heat sink; and Feedback means coupling said output circuit means to said oscillator means and including a thermistor coupled to said heat sink and having a time period of temperature change substantially equal to the time period of temperature change of said vertical deflection windings of said deflection yoke.

9. The combination of claim 8 wherein said thermistor and said heat sink are external to said vertical deflection windings and combine to provide a change in impedance of said thermistor at a rate and within a time period substantially equal to the rate and time period for effecting a similar change of impedance of said vertical deflection windings of said deflection yoke.

10. The combination of claim 8 wherein is included a non-linear device coupling said oscillator-driver means to said output circuit means whereby a linear output signal from said vertical deflection windings of said deflection yoke is provided.

11. The combination of claim 10 wherein said non-linear device is a diode.

* * * * *

PO-1050
(5/69)

UNITED STATES PATENT OFFICE
CERTIFICATE OF CORRECTION

Patent No. 3,796,912 Dated March 12, 1974

Inventor(s) DAVID LEE FUNSTON

It is certified that error appears in the above-identified patent and that said Letters Patent are hereby corrected as shown below:

Col. 3, Line 2, "wherein" should read --- whereon ---

Col. 3, Line 55, "heat 38 source" should read --- heat source 38 ---

In the Drawing, Fig. 2 - Heat sink 38 affixed to transistor 37 and thermistor 49.

Signed and sealed this 17th day of September 1974.

(SEAL)
Attest:

McCOY M. GIBSON JR.
Attesting Officer

C. MARSHALL DANN
Commissioner of Patents